Patented Apr. 25, 1950

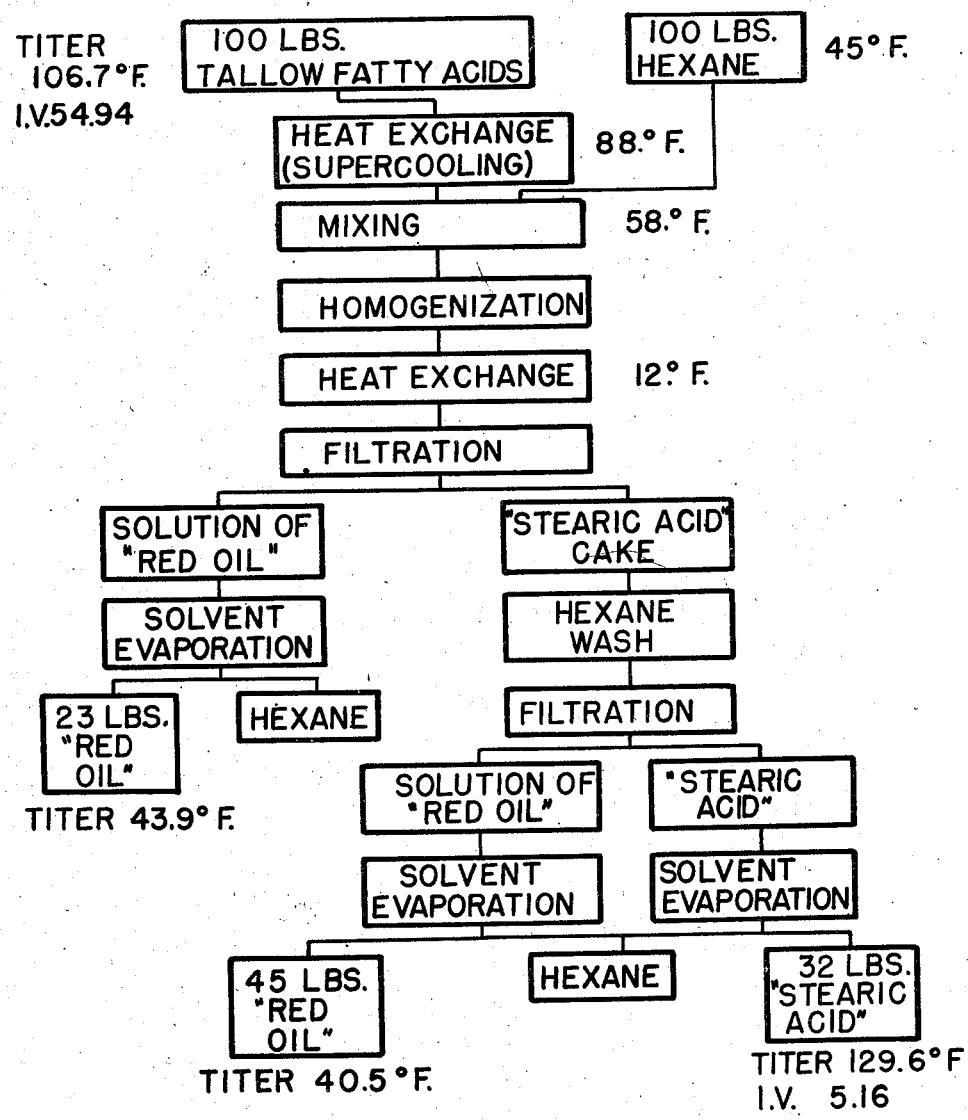

2,505,012

UNITED STATES PATENT OFFICE 2,505,012

SEPARATION OF FATTY ACIDS

Hiram T. Spannuth, Chicago, Ill., assignor to Wilson & Co., Inc., a corporation of Delaware Application July 2, 1947, Serial No. 758,695

9 Claims. (Cl. 260—419)

This invention relates to a method for the separation of higher fatty acid fractions from mixtures thereof. More particularly, it relates to a method for separating mixed higher fatty acids into fractions, one a mixture of saturated acids and the other a mixture of unsaturated acids. It also relates to a method for separating mixed higher fatty acids into fractions, one a solid fraction relatively rich in saturated acids, and the other a liquid fraction relatively rich in unsaturated acids. It relates also to a method for separating mixed vegetable fatty acids, and mixed animal fatty acids into fractions of different melting points.

There are several prior art processes for separating mixed higher fatty acids into "stearic acid" and "red oil." As used hereinafter, and unless otherwise noted, the term "stearic acid" refers to saturated acids consisting primarily of stearic and palmitic acids. The term "red oil" refers to a mixture consisting chiefly of oleic acid but containing other unsaturated acids. According to one of the oldest of these processes, crude fatty materials such as tallows and greases are hydrolyzed into fatty acids and glycerine, and the glycerine separated from the fatty acids. These fatty acids may then be distilled in order to remove impurities. The melted mixture of fatty acids is poured into shallow pans and then cooled in a refrigerated room until the mixture is solidified. The solidified mixture is then removed from the pans, wrapped in canvas cloths, and subjected to hydraulic pressure whereby a large part of the liquid acids, chiefly oleic acid, is pressed out. These liquid acids are sold as "red oil."

The "cold press filter cakes" remaining in the canvas wrappings consist chiefly of solid fatty acids, but also contain substantial quantities of liquid fatty acids. These cakes are removed from the canvas wrappings, remelted, poured back into pans, and cooled to room temperature. The cakes are then removed from the pans, wrapped in hair mats and again hydraulically pressed at a much higher temperature. At this higher pressing temperature, which is above about 100° F., some of the solid fatty acids and most of the liquid fatty acids are pressed out. The expressed fatty acids may be recycled with additional raw material through a "cold press" step or sold as "hot bag stock." The residual cake remaining after the "hot press" operation is then remelted, acid washed, bleached, and sold as "double pressed stearic acid."

The above method of separating mixed higher fatty acids into "stearic acid" and "red oil" is the oldest commercial method in use and is used extensively despite its inherent disadvantages of slowness, high operating cost and necessity for recycling the materials.

In a more recently developed process for separating mixed higher fatty acids into solid and liquid components through the use of a solvent, the hot distilled mixed fatty acids are dissolved in 90% denatured aqueous methyl alcohol or other polar solvent miscible with water and the resulting solution is cooled slowly until the solid fatty acids precipitate in the form of large filterable crystals. The solid fatty acids are separated, as by filtration, and the solvent retained by the separated solid fatty acids is removed as by evaporation, leaving behind "stearic acid." The filtrate is flash distilled to evaporate the solvent leaving "red oil" as a residue. The success of this process appears to depend upon the slow formation of large filterable crystals in the solution of mixed fatty acids. In order to improve the character of these crystals, crystal promotors, such as a neutral fat, have been used to provide foci on which the solid fatty acid crystals are formed during the slow cooling of the solution of the mixed higher fatty acids.

In accordance with the present invention, a mixture of higher fatty acids at a temperature above the melting point of the mixture is rapidly chilled within a few minutes, say within about five minutes, to a temperature which is below the melting point of the fatty acid mixture but above the melting point of the lowest melting constituent fatty acids. For example, in the case of a mixture of lard fatty acids having a melting point of about 100° F., the mixture is heated until its temperature is above 100° F., and is then supercooled within a few minutes to about 60° F. And in the case of a mixture of tallow fatty acids having a melting point of about 110° F., the mixture is heated until its temperature is above 110° F. and then supercooled within a few minutes, to say, 65° F.

Thereupon, the supercooled mixture of higher fatty acids is mixed with a solvent for the higher fatty acids at a controlled low temperature so that a higher melting constituent fatty acid fraction is insoluble or only sparingly soluble in the solvent whereas a lower melting constituent fatty acid fraction is substantially soluble therein. The higher melting fatty acid fraction may then be separated from the solution of the lower melting fatty acid fraction by filtration, centrifuging or otherwise.

It appears as though rapidly chilling a molten mixture of higher fatty acids within a few minutes to a temperature below the melting point of the mixture, but above the melting point of the lowest melting constituent fatty acids, results in a unique physical system comprising a lower-melting constituent fatty acid fraction which is supersaturated with higher-melting constituent fatty acids. This system is metastable and the addition thereto of a solvent which is at a controlled low temperature results in the formation of fine, fluffy crystals of higher-melting constituent fatty acids, in which form they can be readily and effectively filtered and washed.

The rapid chilling of a molten mixture of higher fatty acids to a controlled low temperature in order to produce a supercooled solution comprising a lower-melting constituent fatty acid fraction supersaturated with higher-melting fatty acids can be achieved by continuously pumping a molten mixture of fatty acids through an efficient heat exchanger of the tubular type, or by contacting the molten mixture with a chill roll such as is used in the manufacture of lard, or in other ways.

Regardless of the means used to effect the supercooling of the melted mixture of higher fatty acids, the resulting material comprising a lower-melting constituent fatty acid fraction which is saturated or supersaturated with higher-melting fatty acids, is mixed with a solvent therefor at such a temperature that the higher-melting fatty acids are substantially insoluble therein while a lower-melting constituent fatty acid fraction is soluble in the solvent at that temperature.

According to a preferred manner of carrying out the present invention, a melted, distilled mixture of animal or vegetable fatty acids is passed through a tubular brine-chilled heat exchanger, equipped with scraping blades, at the rate of about fifty pounds per hour to supercool the mixture. The temperature of the supercooled mixture as it leaves the heat exchanger should be below the melting point of the fatty acid mixture but above the melting point of the lowest melting constituent fatty acids. For example, if the melting point of the fatty acid mixture is 100° F. and the melting point of the lowest melting of the constituent fatty acids is, say, 60° F., the temperature of the supercooled mixture as it leaves the heat exchanger should be between 60° F. and 100° F. The supercooled mixture, at this temperature, is then mixed with a solvent for the fatty acids. The solvent may be a polar or non-polar solvent such as acetone, methyl ethyl ketone, isopropyl alcohol and the like, naphtha, hexane, heptane, benzene, xylene, the hydrogenated aromatic hydrocarbons such as hexalin, and the like, including the chlorinated hydrocarbons. It is clear that, in addition to these, any mixture of materials which are solvents for the mixed fatty acids may be used.

The solvent is first pre-chilled to a controlled low temperature, added to the super-cooled fatty acid mixture, and the resulting slurry thoroughly mixed. For this purpose, it is preferable to use from about one to two parts of solvent to one part of the mixed fatty acids. The temperature of the solvent used should not be so low as to effect solidification of the unsaturated acids in the slurry, but low enough so that the saturated acids are substantially insoluble therein. The slurry is preferably further cooled to remove heat of crystallization and to reduce the amount of saturated acids in solution.

The filtrations of the slurry can be carried out in any of several ways, as is well known in the art, though I prefer to use a drum-type vacuum filter for this purpose. Flash distillation of the solvent from the filtrate results in commercial "red oil." The residual filter cake is washed with solvent which is preferably at about the same temperature as the slurry which was filtered. The washed filter cake is a high grade of commercial "stearic acids." The solvent used to wash the filter cake may be used as new "make-up" solvent, may be distilled to give a slightly lower grade "red oil" than is obtained by distillation of the first filtrate, or it may be added to the first filtrate and distilled together with it.

By operating in accordance with the present invention, it is possible to produce a substantially zero degree C. titer "red oil," and commercial grades of "stearic acid" better than the best grades of "stearic acid" produced by any of the prior art processes.

The invention will be fully understood from the following detailed examples of illustrative embodiments of the present invention, taken in conjunction with a schematic diagram of the process of Example 1. While in this example the mixed fatty acids treated were derived from animal fats, it is to be understood that mixed fatty acids derived from garbage grease, brown grease, or other sources of mixed higher fatty acids, including synthetic mixtures thereof, may be similarly treated. In the examples and elsewhere throughout the specification, the term "parts" refers to parts by weight.

Example 1

Tallow fatty acids having a titer of 106.7° F. and an iodine number of 54.94 were heated to a temperature of 130° F. and passed through a tubular-type brine-cooled heat exchanger equipped with a scraper blade to prevent congealing of the fatty acids to the cooling surfaces of the heat exchanger. The brine temperature was about 8° F. The rate of flow of the mixed fatty acids through the heat exchanger was about fifty-five pounds per hour. The temperature of the fatty acid mixture as it was discharged from the heat exchanger was 88° F. and the mixture was turbid in appearance due to the presence therein of fine particles of solid fatty acids. The mixture was then passed through a proportionating valve into an enclosed mixing tank equipped with an agitator. Hexane, prechilled to a temperature of 45° F., was passed into the same mixing tank through a second proportionating valve at such a rate that the ratio of fatty acids to hexane was 1 to 1.5 by weight. The slurry, consisting of hexane and fatty acids and at a temperature of about 58.0° F., then passed through a restricted orifice, in order to break up and disperse any lumps of solid fatty acids, into a second heat exchanger similar to the first-mentioned heat exchanger, at a rate of about one hundred twenty-five pounds per hour. The temperature of the brine circulating around the second heat exchanger was about 10° F. The temperature of the slurry discharging from this second heat exchanger was 12° F. The slurry was then immediately filtered under a gauge vacuum of 27 inches. The residue remaining after evaporation of the solvent from the filtrate had a titer of 43.9° F.

The filter cake, consisting mainly of solid fatty acids, was washed with an equal part of hexane at a temperature of 12° F. This wash filtrate, on evaporation of the solvent, left a residue of "red oil" having a titer of 40.5° F. On being freed of solvent, the solid fatty acid filter cake was found to have a titer of 129.6° F. and an iodine number of 5.16.

Example 2

This was identical to the experiment in Example 1 except that in the second heat exchanger, the slurry was chilled to 32° F., and the solid fatty acid filter cake was washed with an equal part of hexane at a temperature of 32° F. After flash-distillation of the filtrate, the residue had a titer of 52.5° F. After removal of the solvent from the solid fatty acid filter cake, the resulting solid fatty acid cake had a titer of 129.9° F. and an iodine number of 4.46. The "red oil" remaining after the washing filtrate was freed of solvent had a titer of 52.2° F.

Example 3

Fifty pounds of distilled tallow fatty acids with a titer of 106.7° F. and an iodine number of 54.94 were heated to 150° F. and passed through a tubular-type brine-chilled heat exchanger at the rate of fifty pounds per hour. The temperature of the cooling brine was 10° F. and the temperature of the mixed fatty acids at the point of discharge from the heat exchanger was 96° F. The mixture of fatty acids was then immediately pumped into an enclosed mixing vessel equipped with an agitator, and an equal part of acetone, at a temperature of 40° F., was pumped into the mixing vessel. The resulting slurry, which was at a temperature of 55.4° F., was discharged through a restricted orifice, in order to break up any large lumps of solid acids, into another heat exchanger similar to the first-mentioned heat exchanger. The temperature of the cooling brine was about 10° F., and the rate of flow of the slurry through the second heat exchanger was about one hundred pounds per hour. The temperature of the slurry at the point of discharge from the second heat exchanger was 32° F. The slurry was filtered immediately, under a gauge vacuum of 28 inches, to separate the solid acids from the solution of liquid acids in the acetone. The filtrate was distilled, leaving a residue of "red oil" having a titer of 49.3° F. and an iodine number of 81.01.

The filter cake consisting of solid fatty acids and solvent was washed with acetone at a temperature of 32° F., using one part of acetone to one part of solid acids. The wash filtrate was flash-distilled, leaving a residue of "red oil" having a titer of 51.8° F. and an iodine number of 80.76. The solvent was evaporated from the solid filter cake, leaving a residue consisting of "stearic acid" having a titer of 129.6° F. and an iodine number of 4.31.

Example 4

The foregoing experiment was repeated with the slurry in the second heat exchanger being cooled to 12° F. The washing acetone was also cooled to 12° F. The resulting washed filter cake had a titer of 128° F. The "red oil" obtained by flash-distilling the filtrate had a titer of 33.0° F. and an iodine number of 86.90. The "red oil" obtained by flash-distilling the solvent used in washing the solid fatty acid filter cake and a titer of 33.2° F. and an iodine number of 87.9.

The present invention is not to be construed as being limited to the details of the specific examples except insofar as these details are included within the scope of the appended claims.

It is further to be understood that the liquid unsaturated higher fatty acids referred to in the specification and claims are those higher fatty acids which are liquid at room temperature, and the solid higher fatty acids referred to are those which are solid at room temperature.

Furthermore, the method of my invention is applicable not only to the separation of "stearic acid" and "red oil" from mixtures thereof, but also to the separation of mixed higher fatty acid esters, for example, glycerol esters, into fractions having different melting points. It is also applicable to the separation into fractions having different melting points of mixtures of higher fatty alcohols, mixtures of higher fatty acid amides, vegetable waxes, and the like. My invention is also applicable to the fractionation of mixtures of higher fatty acids having pronounced differences in chain length, such as cocoanut, palm kernel, and babassu fatty acids. It is likewise applicable to the fractionation of mixtures of esters, glycerol esters, for example, of higher fatty acids having pronounced differences in chain length.

In general, the best results are obtained in accordance with the present invention when a melted mixture of higher fatty acids is rapidly cooled to a temperature below the melting point of the mixture, but above the melting point of the lowest melting constituent fatty acids. This temperature will vary somewhat, according to the composition of the higher fatty acid mixture. Good separations of "stearic acid" and "red oil" from mixtures thereof have been obtained when a molten mixture of higher fatty acids, comprising about 40% of solid acids, the said mixture having a titer of about 105° F., has been supercooled within a few minutes to a temperature of about 75° F. to 85° F., and about one to two volumes of solvent, prechilled to a temperature of about 10° F. to 40° F., added thereto. The temperature to which the resulting slurry is lowered and at which it is maintained until filtration can be readily determined from a three-component phase diagram for the particular solvent, the higher melting fatty acids and the lower melting fatty acids, as is well known to a person skilled in the art. The selected temperature is such that for a particular system consisting of a solvent, higher melting fatty acids, and lower melting fatty acids, only the lower melting fatty acids and a permissible amount of higher melting fatty acids remain in solution.

I claim:

1. A method of separating a mixture of higher fatty acids into fractions having different melting points comprising rapidly cooling a liquid mixture of the said higher fatty acids to a temperature which is below the melting point of the said mixture but is above the melting point of a component fraction of the said mixture, contacting the cooled mixture with a solvent therefor, which is at a temperature so low that a higher melting fatty acid fraction is insoluble therein, and separating the undissolved fatty acid fraction from the dissolved fatty acid fraction.

2. A method of separating a mixture of higher fatty acids into fractions having different melting points comprising rapidly cooling a molten mixture of the said higher fatty acids from a temperature above the melting point of the said mixture, to a temperature which is below the melting point of the said mixture but above the melting point of a component fraction of the said mixture, contacting the cooled mixture with a solvent therefor at such a temperature that a higher melting fatty acid fraction is insoluble therein, and separating the undissolved fatty acid fraction from the dissolved fatty acid fraction.

3. A method of separating a molten mixture of normally liquid higher fatty acids and normally solid higher fatty acids into fractions having different melting points comprising rapidly cooling the said molten mixture from a temperature above the melting point of the mixture to a temperature which is below the melting point of the said mixture but above the melting point of a component fraction thereof, contacting the cooled mixture with a solvent therefor at such a temperature that a higher melting fatty acid fraction is insoluble therein, and separating the undissolved fatty acid fraction from the dissolved fatty acid fraction.

4. A method of separating a mixture of higher fatty acids into fractions having different melting points comprising raising the temperature of the said mixture above its melting point, rapidly cooling the said mixture from a temperature above its melting point to a temperature below its melting point but above the melting point of a component fraction of the said mixture, contacting the cooled mixture with a solvent therefor at such a temperature that a higher melting fatty acid fraction is insoluble therein, and separating the undissolved fatty acid fraction from the dissolved fatty acid fraction.

5. A method of separating a mixture of higher fatty acids into fractions having different melting points comprising cooling a molten mixture of the said fatty acids to form a metastable system containing solid nuclei of the higher melting fatty acids, contacting the cooled mixture with a solvent therefor, which solvent is at a temperature so low that a higher melting fatty acid fraction is insoluble therein, and separating the undissolved fatty acid fraction from the dissolved fatty acid fraction.

6. A method of separating a mixture of higher fatty acids into fractions having different melting points comprising rapidly cooling a molten mixture of the said higher fatty acids from a temperature above the melting point of the said mixture, to a temperature below the melting point of the said mixture but above the solidification point of a lower melting fraction thereof, contacting the cooled mixture with a solvent therefor at a temperature so low that a higher melting fatty acid fraction is insoluble therein, and separating the undissolved fatty acid fraction from the dissolved fatty acid fraction.

7. A method of separating a mixture of oxygenated higher aliphatic compounds of individual groups selected from the class consisting of the higher fatty acids, their esters and amides, and the corresponding alcohols into fractions having different melting points comprising rapidly cooling a liquid mixture of the said fatty acid derivatives to a temperature which is below the melting point of the said mixture but is above the melting point of a component fraction of the said mixture, contacting the cooled mixture with a solvent therefor at a temperature so low that a higher melting fraction is insoluble therein, and separating the undissolved fraction from the solution of the dissolved fraction.

8. A method of separating a mixture of higher fatty acid esters into fractions having different melting points comprising rapidly cooling a liquid mixture of the said higher fatty acid esters to a temperature which is below the melting point of the said mixture but is above the melting point of a component fraction of the said mixture, contacting the cooled mixture with a solvent therefor at a temperature so low that a higher melting fraction is insoluble therein, and separating the undissolved fraction from the dissolved fraction.

9. A method of separating tallow fatty acids into stearic acid and red oil which comprises melting the tallow fatty acids and rapidly cooling the molten fatty acid to a temperature below its titer and in the range from about 75° to about 96° F., admixing therewith a solvent in the proportion of about 1 to about 1.5 parts by weight of solvent to 1 part by weight of fatty acids, said solvent being precooled to a lower temperature than the fatty acids, cooling the resulting slurry to a temperature from about 12° to about 32° F., thereby effecting solution of red oil components in the solvent, the stearic acid components being substantially insoluble therein, and separating the undissolved stearic acid components from the dissolved red oil components.

HIRAM T. SPANNUTH.

REFERENCES CITED

The following references are of record in the file of this patent:

UNITED STATES PATENTS

| Number | Name | Date |
| --- | --- | --- |
| 2,098,007 | Mapes et al. | Nov. 2, 1937 |
| 2,293,676 | Myers et al. | Aug. 18, 1942 |
| 2,340,104 | Brown | Jan. 25, 1944 |

OTHER REFERENCES

Foreman et al., "Oil & Soap," vol. 21, July 1944, pp. 183–187.